(12) United States Patent
Bailey et al.

(10) Patent No.: US 7,207,001 B2
(45) Date of Patent: Apr. 17, 2007

(54) SYSTEM AND METHOD FOR GENERATING CUSTOMIZED AND/OR PERSONALIZED DOCUMENTS

(75) Inventors: Wynn Bailey, Cloverdale, CA (US); Robert Paul Lee, Santa Rosa, CA (US); Jeffrey Jooste, Gig Harbor, WA (US); Brad Nelson, Windsor, CA (US); Michael Olenick, Irvine, CA (US)

(73) Assignee: Avery Dennison Corporation, Pasadena, CA (US)

( * ) Notice: Subject to any disclaimer, the term of this patent is extended or adjusted under 35 U.S.C. 154(b) by 392 days.

(21) Appl. No.: 09/912,188

(22) Filed: Jul. 24, 2001

(65) Prior Publication Data
US 2002/0059278 A1    May 16, 2002

Related U.S. Application Data

(63) Continuation-in-part of application No. 09/684,055, filed on Oct. 6, 2000.

(60) Provisional application No. 60/201,234, filed on May 1, 2000.

(51) Int. Cl.
*G06F 15/00* (2006.01)

(52) U.S. Cl. .................. 715/513; 705/34; 705/37; 707/102

(58) Field of Classification Search ............... 715/846, 715/513, 27, 37; 707/9; 709/219; 705/27, 705/37; 358/1.15
See application file for complete search history.

(56) References Cited

U.S. PATENT DOCUMENTS

| 4,712,929 A | 12/1987 | Kitaoka | 400/76 |
|---|---|---|---|
| 4,939,674 A | 7/1990 | Price et al. | 364/523 |
| 5,450,541 A | 9/1995 | Rourke et al. | 395/155 |
| 5,521,710 A | 5/1996 | Strossman et al. | 358/296 |
| 5,559,934 A | 9/1996 | Ogura et al. | 395/117 |
| 5,570,291 A | 10/1996 | Dudle et al. | 364/468.01 |
| 5,621,864 A | 4/1997 | Benade et al. | 395/117 |
| 5,930,810 A | 7/1999 | Farros et al. | 707/506 |
| 5,960,411 A | 9/1999 | Hartman et al. | 705/26 |
| 5,991,735 A | 11/1999 | Gerace | |
| 6,006,281 A | 12/1999 | Edmunds | |
| 6,012,045 A * | 1/2000 | Barzilai et al. | 705/37 |
| 6,088,702 A | 7/2000 | Plantz et al. | |
| 6,226,657 B1 | 5/2001 | Andersen | |
| 6,263,352 B1 * | 7/2001 | Cohen | 715/513 |
| 6,313,835 B1 * | 11/2001 | Gever et al. | 715/846 |
| 6,609,108 B1 * | 8/2003 | Pulliam et al. | 705/27 |
| 6,631,375 B2 * | 10/2003 | Jecha et al. | 707/9 |
| 6,732,161 B1 * | 5/2004 | Hess et al. | 709/219 |
| 6,873,971 B1 * | 3/2005 | Tackbary et al. | 705/27 |

* cited by examiner

*Primary Examiner*—William Bashore
*Assistant Examiner*—Quoc A. Tran
(74) *Attorney, Agent, or Firm*—Scott R. Hansen; Fulwider Patton LLP (57) ABSTRACT

A system and method for rapidly customizing and printing documents is disclosed. The system supports product lines having a plurality of customizable products therein, through the use of a single Web page that is continually updated in a data-driven fashion. The system is robust, easily expandable, and quickly deployable across a plurality of user platforms and geographic locations. Methods of the invention disclosed herein enable users to perform customization projects and to print the documents created thereby, either at a remote printer such as at a document factory, or at the user's own, local printer.

5 Claims, 5 Drawing Sheets

SYSTEM AND METHOD FOR GENERATING CUSTOMIZED AND/OR PERSONALIZED DOCUMENTS

RELATED APPLICATIONS

This application is a continuation-in-part of U.S. patent application Ser. No. 09/684,055 filed Oct. 6, 2000, now pending, which claims the benefit of U.S. Provisional Application No. 60/201,234, filed May 1, 2000. This application claims the benefit of U.S. patent application Ser. No. 09/684,055 filed Oct. 6, 2000, and U.S. Provisional Application No. 60/201,234, filed May 1, 2000.

BACKGROUND OF THE INVENTION

1. Field of the Invention

The present invention relates to designing and printing customized documents. More particularly, the present invention relates to a computer based system and method for customizing a document online and then printing the document, at either a remote or a local printer.

2. General Background and State of the Art

Computer software for custom document design enables users to design and print custom-created documents, such as invitations, business cards, posters, and the like. There is wide-spread demand for custom document design software. For example, retailers need custom-printed point-of sale displays and advertising materials; direct marketers utilize printed materials for direct mailings and coupons; promotion firms use printed materials to announce events; independent business persons and entrepreneurs use printed materials for advertising, and also need customized stationary, business cards, and the like.

Until recently, custom document design software was typically resident on a user's personal computer. Software such as the highly-regarded Avery Wizard®, used in Microsoft Word®, and LabelPro® programs allow users to customize and personalize documents on a personal computer, and then print the documents at a local printer. While these programs are very popular and are in wide-spread use, the development of the Internet opens up new possibilities for custom document design. With existing PC-based document customization and personalization software, the user must take time to install the software on the personal computer. Even after the software is loaded onto the personal computer, it must be periodically upgraded, which takes still further time. Also, changes in a printing company's paper product line cannot be implemented within the locally installed software, unless the software is upgraded or re-installed. Therefore, maintenance on such software applications is time consuming and, perhaps, not likely to occur. This makes it difficult for users to maintain consistent access to current paper product lines as new paper products are introduced, changed, or added.

There are now a few client-server, network-based custom-printing systems that allow a user to access software that is stored on a server, design a document while connected to the server, and then print the document after the design has been completed. However, existing network-based printing systems do not provide sufficient speed and flexibility. One common approach is to first build a graphical representation of a document to be printed (or "render" the document image) on the server. Then, the graphical representation is converted into a format such as a Portable Document Format ("PDF"), and the PDF file is transmitted to the client. The client then renders the image again on the client before printing it on a printer. The process of rendering the image two times—first at the server and then at the client—is slow and inefficient. The capacity of the server to serve multiple simultaneous users is also limited by the need to undertake the computationally-intensive task of rendering the graphic on the server.

Another problem with existing network-based systems for designing and printing customized documents relates to the manner in which the web browser communicates with the server. A web browser is a mechanism for housing software and viewing text and graphics from the Internet. The browser running on the user's computer accepts the data from the user and formats the data into a data stream using HyperText Markup Language ("HTML"). The phrase "data stream," when used herein, applies equally to data received as if it were an incoming stream and to data that has been received in this manner and stored in a file. HTML is a standardized notation for displaying text and graphics on a computer display screen, as well as providing more complex information such as animated video and sound.

In addition to the inflexibility of network-based custom-printing systems as described above, these systems require significant amounts of time and energy to manage, maintain and upgrade. For example, as a product line develops, changes, and expands, network-based custom-printing systems operated on web sites utilizing HTML documents must be continually updated to reflect these changes in the product line. Additionally, changes to the operation of the system may only be implemented by updating the HTML documents. Further, the number of HTML documents that must be managed can become excessive as the product line grows. For example, if each available product is represented by an HTML document which is then updated as the user enters changes during a customization process, the number of HTML documents utilized by the system is at least as large as the number of products available within the product line. Further, variations on products may require separate HTML documents, thereby multiplying the number of documents that must be managed, maintained and updated within such a system. Moreover, the number of HTML documents increases as the systems become operable in various countries, as a separate HTML document for each product must be created in the native language of each country. These significant maintenance efforts translate to increased time and cost to operators of such network-based printing systems.

SUMMARY OF THE INVENTION

The present invention relates to an efficient system and method for generating customized and/or personalized documents, typically over a network having a client and a server.

One embodiment of the present invention is an efficient method for generating and printing customized documents in a system having a client communicable with a network and a server communicable with the network. The client user is guided through a series of steps to choose a default project document that is compatible with the user's printable media product. After a document is selected, an interactive form is displayed on the client. User information is entered onto the interactive form, and is transmitted from the client to the server over the network. Default document parameters are obtained from a template file, which may be, for example, an XML file, a serialized software object (e.g. a JavaBean™) or a plain text file. A program, operable on the server, generates or updates an HTML page based upon the default document parameters and the user-defined information. As used herein, the term "updated" is used to describe the building of an HTML page based on user input data. However, it is to be understood that an updated page is a newly built or re-generated page. The updated HTML page is transmitted to the client and is rendered for the first time at the client.

The method may also include various other features and steps. The step of obtaining default document parameters from a template file may include parsing the template file for specific tokens that relate to the client's most recent request. Thus, the template files may be in the form of tagged text data, such as Extensible Markup Language (XML) data. The step of transmitting user-defined information comprises transmitting information in Hypertext Markup Language (HTML) code. The user information is divided into named fields, and may include a variety of information, such as name, address, telephone number, facsimile number, e-mail address, text message, graphic selection, and/or type of document to be generated. The user information may also include formatting information such as font type, font color, font size, location of text on the document, and/or location of graphics on the document.

Additionally, printable media products may take to form of software objects (such as JavaBeans™), which generate strings of text describing the media products. The interactive project selection process presented to the client, therefore, may be presented as a series of transient HTML pages, readable within a Web browser and dynamically regenerated according to user input and the presence of media product objects and document templates on the server. Specifically, the user input causes selection of the product objects, and incorporation of text from those objects within the context of the next generation of the HTML page. By utilizing software objects, the novel system of the present invention is uniquely data driven. That is, instead of comprising multiple HTML pages dedicated to hard-coded descriptions of an entire product line, the product line is defined by self-contained object files, which are selected by a user's input and merged into a transient HTML page. The system is thus data-driven, according to the user's input, and highly streamlined. In this manner, a single HTML page design is robust enough to handle any of a multiplicity of projects desired by a user, according to any product within a supported product line. As the product line changes, the page design does not need to be updated or maintained; rather, new product object files are created, which is a relatively simpler task.

Of course, it is to be understood that the present invention is not limited to use with JavaBeans™. Rather, methods and systems of the present invention may use any of a number of descriptive files to represent products within a product line. Such files may be called "project objects," "product object files" or "SKU object files" and contain descriptive product data therein. JavaBeans™ are an exemplary descriptive file type used herein for illustrative purposes only, and should not be read in a limiting sense.

Furthermore, product object files are fully portable, in that a number of different Web sites, or other systems, may be created to handle and support the product object files. In this way, various customized Web sites may be established for clients, yet they may be driven by standard, non-customized product objects. Further, product objects may be "dropped" into any of a number of compatible systems and deployed readily. This feature of the invention is highly advantageous for portability and efficiency. For example, a Web site in a foreign country may be established to handle product objects that already exist for a certain product line as utilized on a domestic country's Web site. To present the product line in the foreign country, the product line does not need to be re-defined, nor does an entire new system need to be built. Rather, a single Web page capable of receiving the product objects and displaying the data they contain in the foreign language is provided, which is a relatively simple task. With the creation of only one Web page, and without the re-definition of the entire product line, the entire system is instantly capable of being operated in the language native to that foreign country. Systems designed according to the present invention are therefore capable of rapid deployment in multiple configurations. Absent the data-driven capability provided by the product objects, an entire system, comprising multiple Web pages, would need to be created in the foreign language. Therefore, the inventive use of product objects in the customization system that supports an entire product line with a single Web page results in a very robust, transportable, and highly efficient method and system for providing customizable projects related to a particular product line to users over a computer network.

Methods of the present invention may further include the step of creating a printable file and printing the printable file on a client-controlled printer. The printable file may need to accommodate mechanical characteristics of the particular client-controlled printer in the form of horizontal and vertical page position offsets. The offsets are stored for each user for each kind of major paper size including US Letter and A4 paper sizes. The offset value is selected by an optional alignment procedure the customer may execute from within the program after creating any printable file. Thereafter the new offset value is stored and the offset is automatically supplied to every subsequent printable file generated by the user until the customer elects to modify the offset.

The client-controlled printer can be a standard office printer, such as a laser printer, inkjet printer, or bubblejet printer, or a commercial printer. Alternatively, the page description file may be transmitted from the client to a separate printing facility for printing on a commercial printer.

The printable document file can be a Portable Document Format (PDF) file, a Postscript file or another format known in the art or developed in the future. The client may be a desktop computer, a Personal Digital Assistant (PDA), or another type of client that can interact with a server over a network, including a telephone that has a browser. The network can be an intranet or the Internet, or the means for connecting the client to the server can be a direct connection without the use of a network at all.

In an exemplary embodiment, providers of systems of the present invention publish the Web page such that users, through the Web page, post data to a server. The data may include, for example, customization and personalization data. During the customization process, pre-made project files are utilized to collect and organize the data from the user, as well as to present the data to the user in a visual format, as a print preview. The updated Web page, having the customization and personalization data incorporated therein, is then parsed to create a printable document, which results in a printed version of the user's print preview.

Default project files may be generated with a Graphical User Interface (GUI), and stored on the server. A graphical visual representation of the project file may be created with the GUI and then saved as an output data file. The project files may include default values for at least one of the following: font type, font color, font size, background color, location of text on the document, location of graphics on the document, size of the document, and/or shape of the document. The project files may also be in the form of an XML document.

The method may also include the step of determining mechanical characteristics of a client-controlled printer. The printable file can then be built for compatibility with the particular client-controlled printer. The positional accuracy is thereby enhanced. Thus the printable file can be built to ensure that the document is printed at a particular page location consistently from printer to printer In accordance with another aspect of the invention, an efficient method for generating customized electronic documents for printing includes receiving via an online connection an identification of a document template. A document template defining default attributes of a document to be printed is then obtained. Document customization information and document personalization information is then received, and a set of instructions to a page description file builder is generated. The instructions instruct the page description file builder to build a document based upon a combination of the default attributes of the document to be printed, the document customization information, and the document personalization information. A page description file is built from the set of instructions, and is transmitted to a client for rendering and then printing at a printer. For efficiency, the steps of formulating a set of instructions and building a page description file are accomplished without first graphically rendering the document, and the document is graphically rendered for the first time at the client. Also, for ease of use, as document customization information and document personalization information is received, such as through an interactive form displayed in an HTML page, the HTML page is continually updated to reflect incorporation of the received information. For example, the HTML page may include a preview image of the customized document, and the preview image may be continually updated to incorporate the effect of each piece of customization and personalization information is received by the user.

In another aspect of the invention, a processing server is programmed to receive information via a network from a user. The information can include document customization information and/or document personalization information. The server is also programmed to obtain a document template that defines default attributes of a document to be printed, and to formulate a set of instructions to a page description file builder. The instructions instruct the page description file builder to build a document based upon a combination of said default attributes of the document to be printed, the document customization information, and the document personalization information. The server is programmed to build a page description from the set of instructions with the page description file builder, and to transmit the page description file to a recipient. The server is programmed to build the page description file without graphically rendering the document. The processing server may further be programmed to determine characteristics of a printer onto which the rendered document will be printed, and to customize the page description file for the printer as, for example, to assure that the printer prints the rendered document in the proper location on the sheet.

Another feature of systems according to the present invention is the provision of unique interfacing with printable document generating engines for the creation of systems utilized for specialized printable products without the use of advanced programming skills. That is, providers utilizing systems of the present invention can create a front-end system component, such as a Web page or interactive form, that easily interfaces with back-end system components, such as pre-made project files, without implementing sophisticated programming. The provider will be required only to utilize, for example, HTML to generate the Web page for the front-end. Higher level programming, such as with Java, C, C++ and the like, are not required of the provider in order for the provider to design and publish a customized document printing system according to the present invention.

The present invention also extends to particular models of doing business with the technology. Various other aspects, features and embodiments of the invention will become apparent in the following Detailed Description, in the drawings, and in the Claims.

DETAILED DESCRIPTION OF PREFERRED EMBODIMENTS OF THE INVENTION

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

As used herein, the term "operator" refers to a provider of systems and methods of the present invention. For example, an operator may be a customer who accepts systems and methods of the present invention and incorporates them into their commercial Web sites. "Users" refer to persons who use the systems and methods of the present invention, such as through a Web site of an operator providing the systems and methods thereon. "Personalization" refers to the process of substituting default data or placeholder art with new data or new art to suit the particular needs of a user, such as entering a name into a "name" field on an interactive form. "Customization" refers to the process of altering values of data on an interactive form, such as changing font attributes. Other terminology and features relative to systems and methods of the present invention will be described herein, where pertinent.

Figure 1:
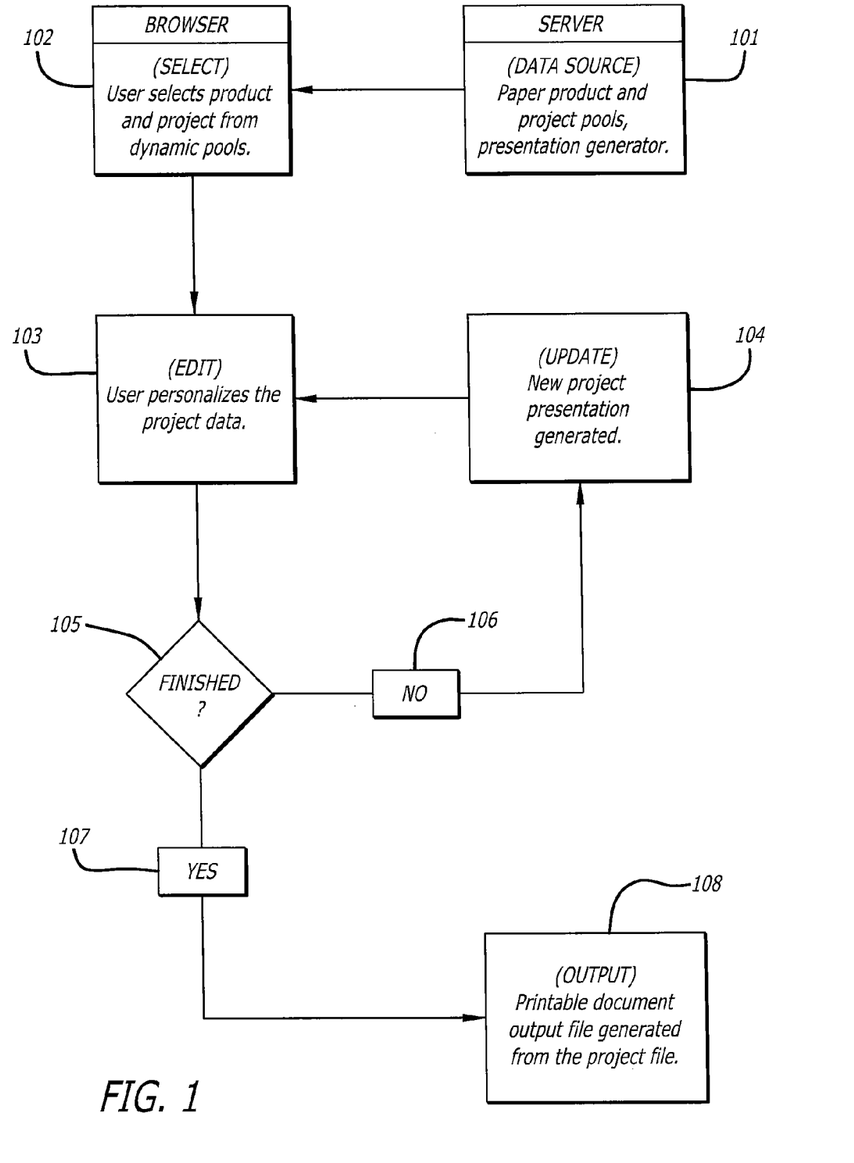
FIG. 1 illustrates the data-driven nature of an exemplary system according to the present invention.

FIG. 1 illustrates the dynamic-page characteristic of an exemplary system 100 according to the invention, wherein pages are generated dynamically according to user input and passed between the client and server in the process of creating an output file defining a printable document. FIG. 1 gives an overview of this system; subsystems of system 100 are shown in more detail at FIGS. 2–5 (discussed later).

Figure 2:
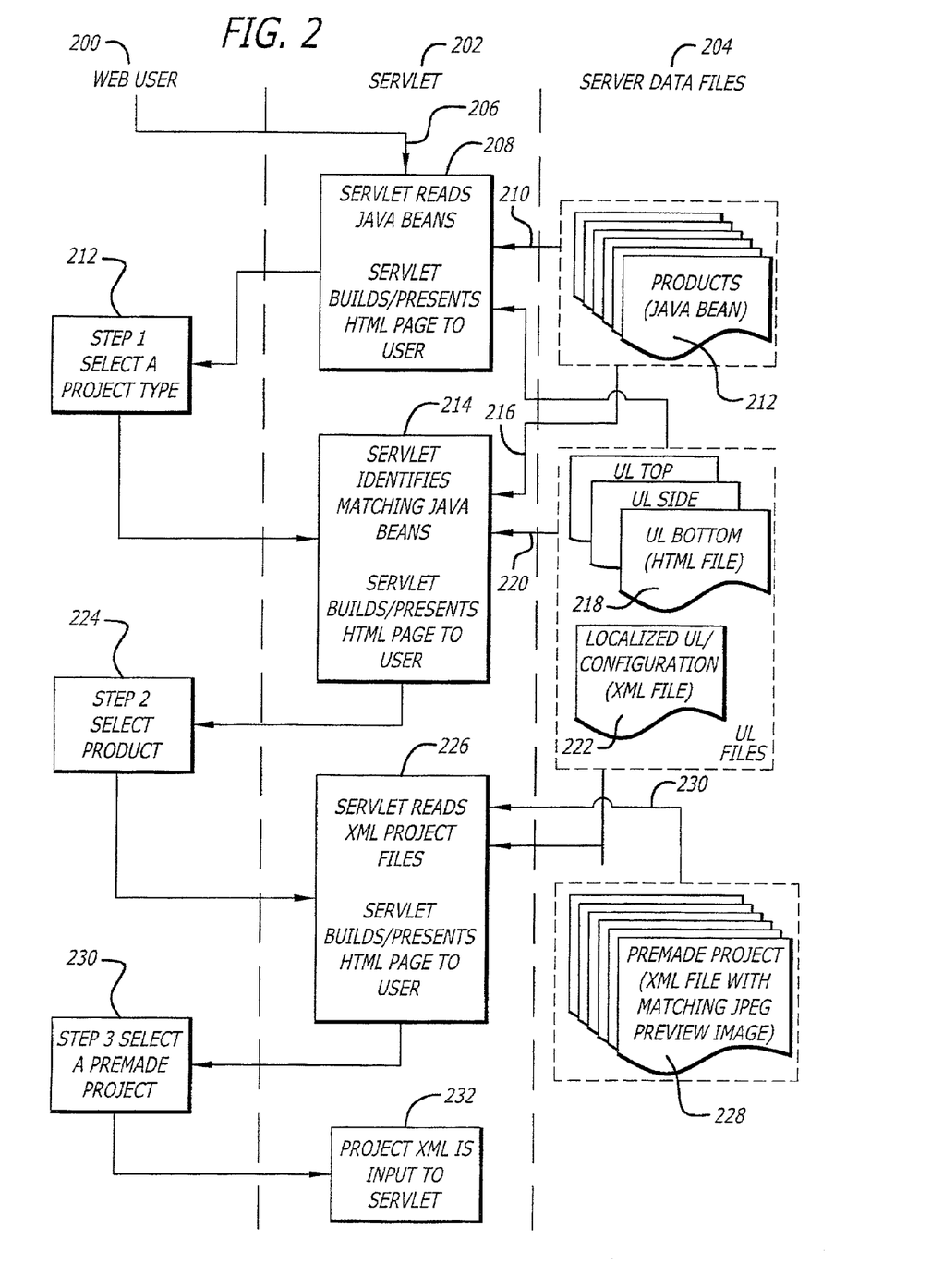
FIG. 2 illustrates detailed steps of the project selection process of an exemplary data-driven system according to the present invention.

"Data Source" step 101 and "Select" step 102 correspond to the more detailed project selection steps that are illustrated in FIG. 2. The Data Source data 101 represents data stored on the server, i.e. a pool of paper products, a pool of projects, and a program that is used to generate the presentation. Presentations are generated that are sent to the browser at "Select" step 102, in which the user selects which paper product to use and which project to work on, from the dynamic pools. The dynamic pools of products may comprise for example JavaBeans™ descriptive of products within a product line. First the user selects the paper product, then based upon the product selected the user is given appropriate options in order to select the project.

Figure 3:
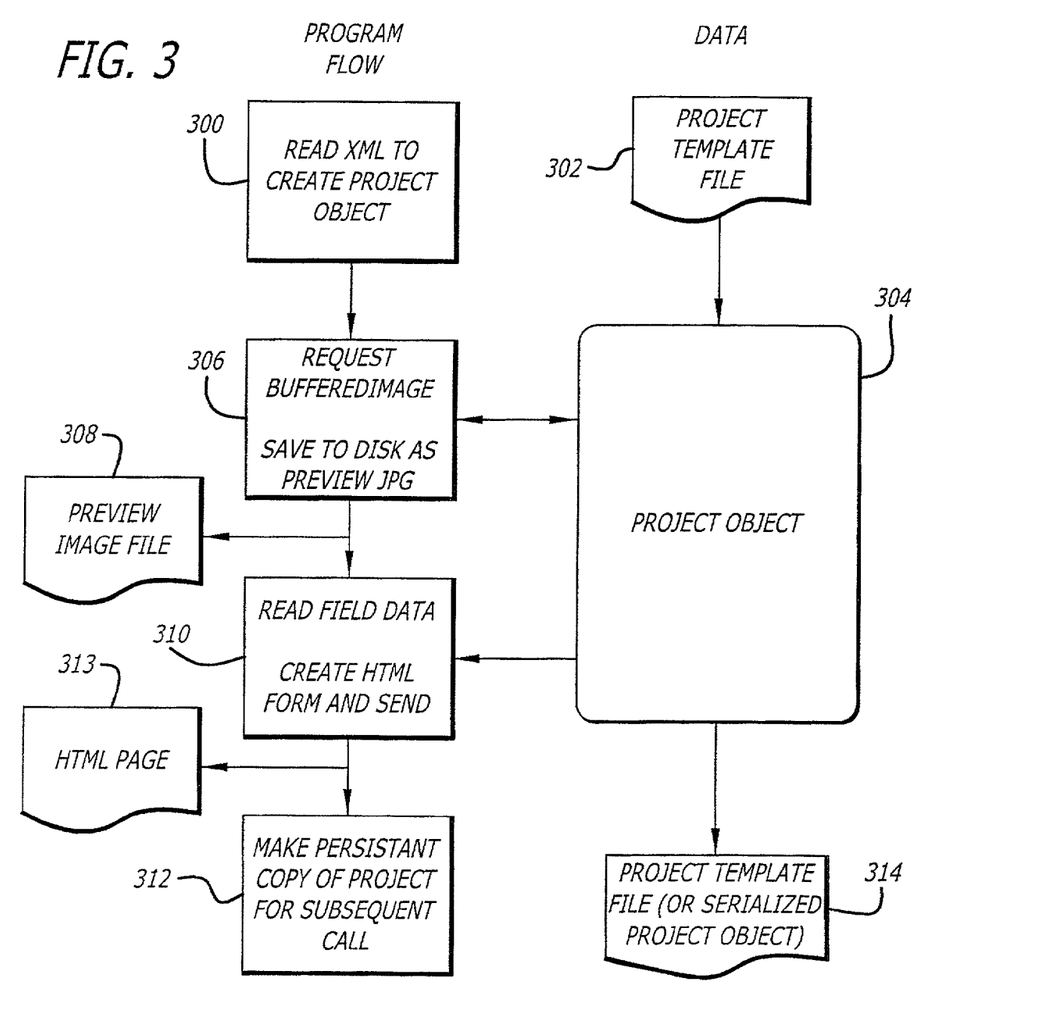
FIG. 3 illustrates initial steps of the document customization process of the exemplary system according to the present invention.

At the "Edit" step 103, an embodiment of which is shown in more detail in FIG. 3, the User personalizes the project data for the selected project, element by element, as part of an iterative loop 103, 104, 105, 106, 107. The user personalizes an element of the project data, and indicates whether the project personalization is finished or not. If the project personalization is not finished, a new project presentation is generated at the "Update" step 104, an embodiment of which is shown in more detail at FIG. 4. At this "Update" stage 104 the updated project is presented to the user again in HTML. The user is then given the opportunity to add another element to the project in the next iteration of "Edit" step 103. This loop is repeated as many times as necessary to allow the user to create personalized projects.

Figure 5:
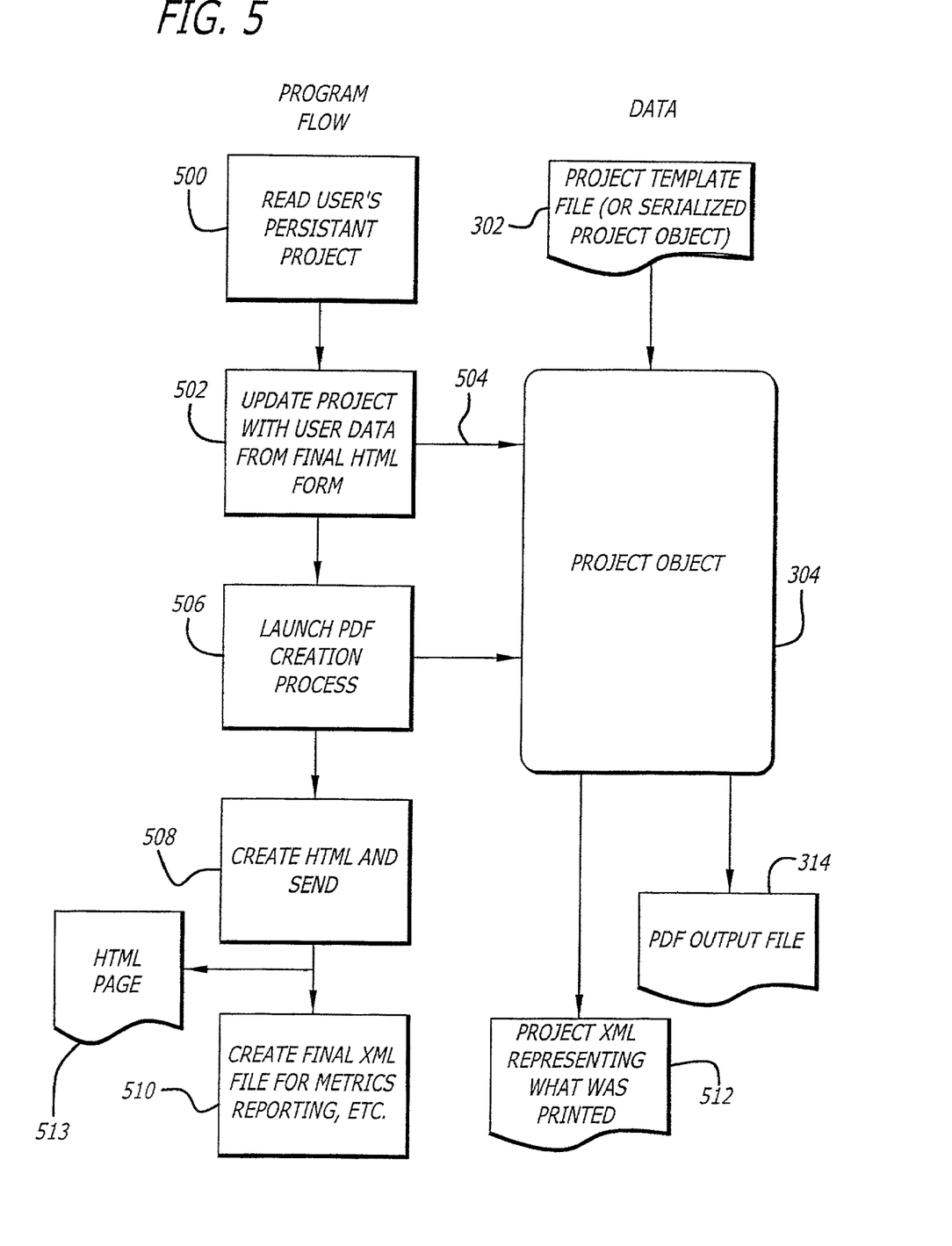
FIG. 5 illustrates the mechanism for exiting the iterative process of FIG. 4, as employed by the exemplary system of the present invention.

When the user finally indicates that he is finished, an output file is generated which is printable at "Output" step 108. A detailed embodiment of this "Output" stage is shown at FIG. 5. The output file may comprise, for example, a PDF file that can be printed from the user's workstation on the paper product selected by the user.

FIG. 2 illustrates three exemplary initial steps executed by an exemplary system of the present invention, and illustrates the data-driven characteristics of the exemplary system. The exemplary system includes or involves a Web user, shown generally at 200, a servlet, shown generally at 202, and server data files, shown generally at 204. Methods employed by the exemplary system are initiated by Web user 200, as shown at 206, when Web user 200 activates servlet 202. This activation causes the servlet to read data from the server data files, as indicated at arrow 210. These data may include, for example, software object files, or more particularly Java-Beans™ 212, describing products contained within a product line and available to the user for customization projects.

As used herein, the term "JavaBeans™" is defined to have its ordinary meaning, as will be easily recognized by those skilled in the art. In their particular applications within the context of the present invention, JavaBeans™ are software objects that are descriptive of products within a product line. For example, the JavaBeans™ may contain specific SKU information for identifying the product within the product line, and presenting the product to the user. They may also contain template family information, which would identify the templates compatible for each particular product. Templates are default design files that are used by a user to customize a product. Therefore, a business card JavaBean™ will contain different template family information than a large poster JavaBean™. JavaBeans™ may also contain project XML file information, identifying which project XML files are compatible with the product. "Project XML files," as used herein, denotes files that contain project-specific information such as user prompts, fields, and the like, that will be presented to a user during the customization process. That is, systems of the present invention utilize projects for allowing users to customize products, and the projects are defined within project XML files. Project XML files are typically designed to be associated with a particular template family, and therefore may be applicable to one or many JavaBeans™. This is because each JavaBean™ is assigned to a template family, and a template family may be applicable to a number of different products. Of course, it is to be understood that the present invention is not limited to use with XML files. XML is merely an exemplary file type used herein for illustrative purposes, and is not intended to be read in a limiting sense.

It will be appreciated by those skilled in the art that systems and methods of the present invention are not limited to use with JavaBeans™ or XML files. Rather, a variety of different software object types may be used to describe products within the system, and a variety of different file types may be used to represent projects associated with the products. The use of JavaBeans™ and XML files herein is for illustrative purposes to describe exemplary embodiments of the present invention, but it is to be understood that the invention is not limited or constrained to use with these specific file types.

Continuing with FIG. 2, and as indicated at block 214, after the user selects a project type, servlet 202 identifies the applicable JavaBeans™ 212, whose data are read in, indicated at arrow 216. Servlet 202 also reads in user interface (UI) files 218, as indicated at arrow 220, which it uses to reconstruct the HTML page presented to the user. UI files 218 are HTML files, and collectively define a single Web page that can be assembled and presented to the user. For example, each UI file might describe a portion of the page, and contain a specific type of information therein. Additionally, a localized UI/configuration file 222, which may be either a separate XML file or localized strings within the user interface itself, define the manner in which the page is to be constructed. For example, localized UI file 222 may cause UI files 218 to display German text for a Web page displayed on a machine in Germany, and cause the same UI files to 218 display the same text, but in English, for a Web page displayed on a machine in the United States. Ultimately, UI files 218 obtain the data they are to display from JavaBeans™ 212 selected by server 202 and read in as indicated at arrow 216. Servlet 202 uses JavaBeans™ 212, UI files 218 and localized UI/configuration file 222 to build and present the HTML page to the user, as the second step of the customization process, indicated at block 224.

In the second step of the customization process, the user is presented with the newly constructed HTML page, which presents choices of products that can be utilized with the project type selected in the previous step, as identified by servlet 202. The user then selects one of the products, which prompts servlet 202 to continue to the next step of the process, as illustrated at block 226. In response to the user's product selection, servlet 202 reads Project XML files 228, which are XML files describing a customization project suitable for the selected project and accompanied by a preview image, such as a JPEG or other image, that may be displayed to the user to aid in the customization process. Project XML files 228 may include code for representing such information as fields available for customization, visual features of the selected product available for customization, and the like. Project XML files 228 are read by servlet 202, as shown at arrow 230, in the context of localized UI/configuration file 222, and servlet 202 then re-constructs the HTML page to display data contained within Project XML files 228, which is presented to the user as the third step of the customization process, indicated at block 230.

In the third step of the customization project, the updated HTML page presents the user with a choice of available projects, and the user selects the desired customization project. Upon the user's selection, the customization project XML, from selected project XML file 228, is input in servlet 202, indicated at block 232. This process is illustrated in greater detail in FIG. 3.

FIG. 3 illustrates additional detail of an exemplary fourth step of the customization process of the exemplary system and method of the present invention. The selected project template 228 is read into the program indicated at blocks 300 and 302, which creates a project object 304. Project object 304 may be any standard software object that is known and used in the art. That is, systems and methods of the present invention will support any type of software object as project object 304. Among other components, project object 304 includes algorithms which can generate a preview image which is requested by the program as indicated at block 306. When the HTML page is rendered to the user, this preview image is displayed, at block 308. Additionally, field data pertinent to the project and contained within selected project template file 228 is read by the program, as indicated at block 310, which populates the HTML page with the field data and displays the HTML page having the field data and the preview image to the user. This feature allows systems of the present invention to comprise a single Web page capable of supporting an entire product line and a hierarchy of project template files 228 applicable to all of the products contained therein. This is because the Web page does not have pre-defined fields for data entry by the user. Rather, such information is stored in project template files 212 and the single Web page is dynamically created according to the information contained within a user-selected project template file 212. In this manner, systems of the present invention are highly efficient, flexible, expandable, and scalable. This is because as the product line changes the system is easily upgraded by simply adding new project template files and new JavaBeans™ or removing outdated combinations of these items. Further, only a single Web page need be maintained. The dynamic creation of the single Web page is also dependent upon localized UI/configuration project template file 222, as described previously, such that the system is completely portable and will support project template file 222 in any geographic location.

In other words, the first time the page is displayed, at blocks 308 and 310, the field data comprises default data, which may be stored in and retrieved from project XML file 228. A persistent copy of the project file is then made, indicated at block 312, and stored to memory for utilization in subsequent calls. The persistent copy is output project XML file 314. A subsequent call is initiated by user interaction with the displayed HTML page, such as by entering field data which replaces the default data. The preview image changes accordingly, and the HTML page is reconstructed and re-displayed to the user, to reflect the updated changes made by the user. In this manner, the process of the fourth step of the exemplary system and method is iterative throughout the customization process. This is described in more detail with reference to FIG. 4.

Figure 4:
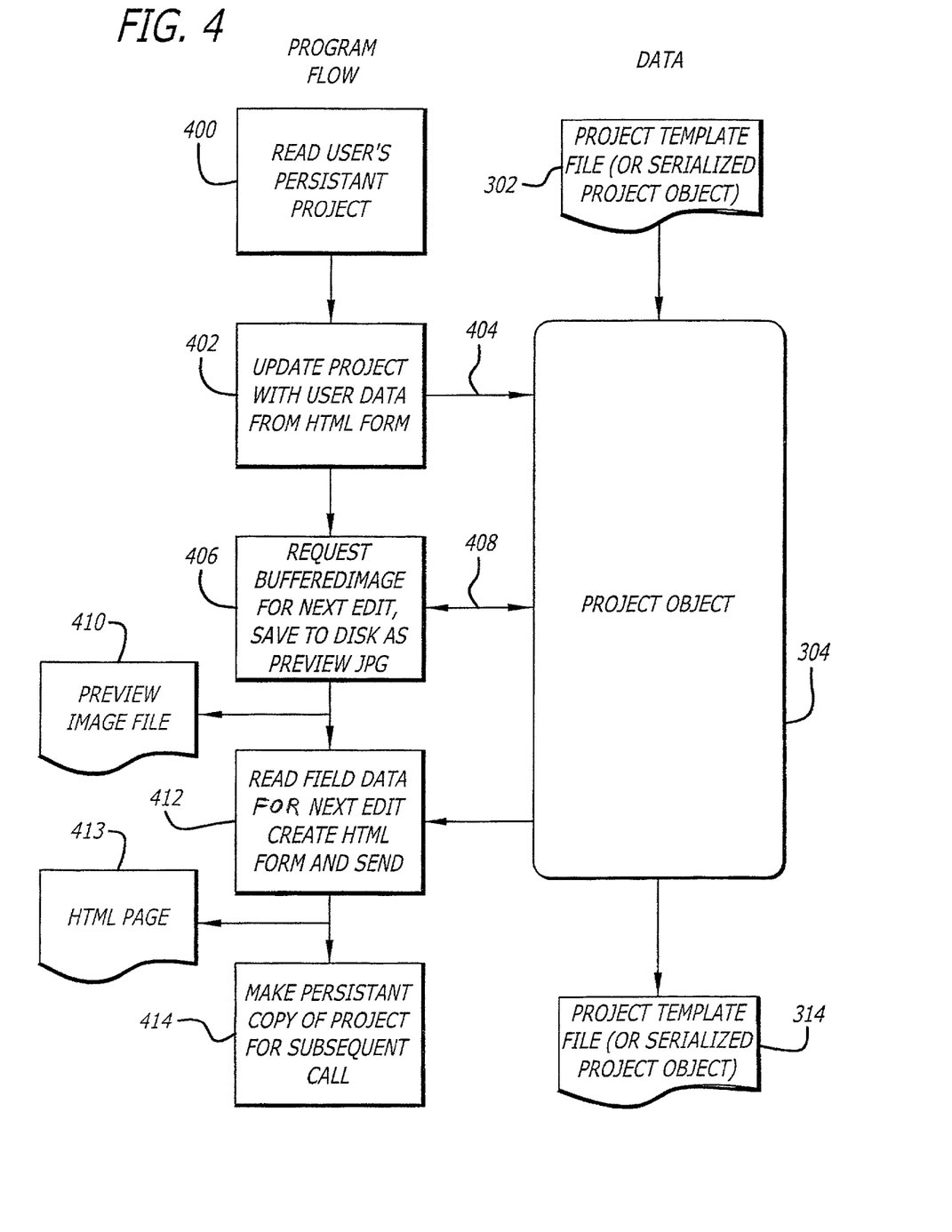
FIG. 4 illustrates an iterative document customization process utilized by the exemplary system according to the present invention.

FIG. 4 illustrates the iterative procedure employed by the servlet as the user enters customization data within the selected project. First, as indicated at block 400, the servlet reads the user's persistent project file, which was created at block 312 of FIG. 3. As the user enters customization data into the displayed HTML form, indicated at block 402, the data is read into project object 304, shown at arrow 404, and the project is updated. At block 406, the servlet requests a current preview image from project object 304 and saves it to disk as preview image 410. At block 412, the servlet reads field data from project object 304 and sends an updated HTML page 413 to the user. Updated HTML page 413 includes localized data from configuration file 222 and preview image file 410. A persistent copy of the project is made and stored to memory, replacing the previous persistent copy. The process described above repeats until the user has completed the customization process and has no further customization data to enter. In this manner, the system is data-driven, such that the preview image is continually rebuilt and displayed to the user to reflect the current status of his customization process according to the customization data provided by the user.

FIG. 5 illustrates the process employed by the exemplary system and method for exiting the iterative process described above and illustrated in FIG. 4. Specifically, the servlet reads the user's most recently stored persistent project, at block 500. At block 502, the project is updated with user data from the HTML form currently displayed and entered into project object 304, as indicated at arrow 504. An external presentation or printing process is then launched, as illustrated at block 506. This process may be, for example, a PDF process, utilizing Java code to generate a PDF output file representing the customized object. Alternatively, the process may involve a DHTML process, which generates a DHTML file for printing. A number of printing solutions are possible and considered to be within the scope of the present invention, which has the objective of supporting the entire customization process within a single HTML page that is continually updated in a data-driven process which culminates in the creation of a printable file that the user is able to print at a remote printer or at the user's own printer. When the user is finished customizing and selects an option to print, such as by clicking on a "print" radio button displayed on the Web page, HTML page 513 is updated a final time, indicated at block 508, and displayed to the user. A final project XML file is created at block 510 to describe the customized product and to include metrics for reporting, printing and the like. Additionally, and as indicated at block 512, a permanent project XML file may be created and stored to represent the product as it was actually printed. This permanent project XML file creates an archived record of printed customization projects.

An additional feature of systems of the present invention is related to security. Through the design of a single Web page system, that is robust in that its UI files 218 support a plurality of JavaBeans™ 212 and a plurality of platforms and geographies through the direction of localized UI/configuration XML file 222, customers may be given the ability to provide customized systems to users, with each customized system fully supporting a standardized set of JavaBeans™ 212. To provide for these features, customers may be granted access to UI files 218, for customization purposes. Customers may customize portions of UI files 218, such as to control the appearance of the HTML page constructed therefrom and presented to users. Other portions of UI files 218 are standardized, such that they receive and display data from JavaBeans™ 212. JavaBeans™ 212, on the other hand, may not be customized or changed by customers. This important security feature enables providers of the system to protect proprietary product lines. JavaBeans™ 212 are typically created by system providers and provided to customers for use with UI files 218 within systems of the present invention, but are not susceptible to modifications by customers. System providers may, however, provide proprietary JavaBean™ creation software to customers, enabling them to create JavaBeans™ for products they would like to include within a product line to be supported by the system. This JavaBean™ creation software may consist of simple code for constructing strings from user input, or may, for example consist of a spreadsheet algorithm or other appropriate method for constructing strings that are to be utilized as JavaBeans™. Certain information will be part of the JavaBean™ creation software such that it is always included in the created JavaBeans™. Such information might include, for example, a trademark displayed on all products within the product line and, therefore, necessary for any JavaBean™ representative of a product therein. This security feature is therefore an important feature for providers of systems of the present invention: product features of standard product line products may not be altered by customers, and while the systems are robust enough to support customized products, even these customized products are assured to include product features essential to the system provider. This allows the system provider to preserve the integrity of its products, while at the same time allowing customers the latitude to design new products and create associated JavaBeans™ that may be incorporated within the standard product line.

As used herein, the term "tailoring" shall be an umbrella term that encompass both customization and/or personalization.

The foregoing description of exemplary embodiments of the present invention have been presented for purposes of enablement, illustration, and description. They are not intended to be exhaustive of or to limit the present invention to the precise forms discussed. Many modifications and variations of the present invention are possible in light of the above teachings. For example, the invention is not limited to use with JavaBeans™; rather, the invention may utilize any descriptive file containing product description data. The invention also is not limited to Project XML files. Rather, a plurality of different file types can be implemented as project template files, as will be recognized by those of ordinary skill in the art. Moreover, the invention need not be implemented by or operable via a servlet. A variety of different programs may be utilized for implementing systems of the invention in ASP, ActiveX, CGI, and the like. Completed customization projects may be printed either remotely, such as at a factory remote from the user's location, or locally, such as at the user's personal printer. Also, the present invention is not limited to use across the Internet. Rather, the invention may be utilized over any computer communications network, including an internal, secure network. Further, although one feature of the invention is to enable customization of products without requiring a user to download software for performing the customization, it is anticipated that systems of the present invention may be employed and practiced on a local machine, without communicating across a network.

What is claimed is:

1. A method of allowing a user to select a customizable, printable paper product from a menu of possible products, tailor the chosen product according to the user's personal preferences, and view the tailored product on a computer display before the tailored product is created, the method allowing for easy updating and maintaining a selection of products available to a user without a need to change an executable software application program, the method comprising:

presenting on a computer screen a list of available printable paper products and receiving from a user in response thereto a product selection defining a user's selected product;

retrieving product data from at least one non-executable data file according to the user's printable paper product selection;

presenting on the computer screen a plurality of fields for the user to input printable paper product tailoring information, the fields being determined by the product data within the non-executable data file;

presenting on the computer screen a preview of the user's selected printable paper product, the product being reflective of the product data retrieved from the non-executable data file and the product tailoring information input by the user;

wherein the data file further includes default product tailoring information, the default tailoring information containing default graphics and default text, and wherein the available products include a first group of products, the first group of products all having a common SKU number but different default tailoring information, and a second group of products which may include a member of the first group of products, the second group of products having different SKU numbers;

wherein the non-executable data files are selected from the group consisting of binary files, Java Beans™, and XML files, and the computer screen displays a world wide web page, the computer screen displaying simultaneously the plurality of fields and the product preview illustrating the product tailored according to the product tailoring information input by the user; and wherein information within the non-executable data file controls which fields will be presented to the user for tailoring the user's selected printable paper product.

2. The method of claim 1 wherein information within the non-executable data file completely controls which fields will be presented to the user for tailoring the user's selected product.

3. A computer readable media capable of causing a general purpose computer to implement the method of claim 1.

4. A method as defined in claim 1, wherein the method further comprises, after the step of presenting on the computer screen a preview of the user's selected printable paper product, the step of printing the printable paper product in a printer at a user's workstation.

5. A method as defined in claim 1, wherein the paper product comprises one of the group constituting invitations, business cards, posters, point-of-sale displays, advertising materials, coupons, event announcements, and stationary.

* * * * *